US010632839B1

(12) United States Patent
Hirsch

(10) Patent No.: US 10,632,839 B1
(45) Date of Patent: Apr. 28, 2020

(54) FUEL TANK ADAPTER FOR A GOLF CART

(71) Applicant: Delwood Hirsch, Delano, MN (US)

(72) Inventor: Delwood Hirsch, Delano, MN (US)

( * ) Notice: Subject to any disclaimer, the term of this patent is extended or adjusted under 35 U.S.C. 154(b) by 3 days.

(21) Appl. No.: 16/102,932

(22) Filed: Aug. 14, 2018

(51) Int. Cl.
*B60K 15/04* (2006.01)
*A63B 55/60* (2015.01)

(52) U.S. Cl.
CPC .............. *B60K 15/04* (2013.01); *A63B 55/61* (2015.10); *B60K 2015/0474* (2013.01)

(58) Field of Classification Search
CPC .. B60K 15/04; B60K 2015/0474; A63B 55/61
USPC ..... 220/86.1–86.2, 301, 328, 327, 324, 212; 141/311 R, 331–334, 337–338, 340, 391, 141/286, 98, 297, 59; 137/351, 58; D15/5; 280/830, 833, 834, 836
See application file for complete search history.

(56) References Cited

U.S. PATENT DOCUMENTS

| | | | | |
|---|---|---|---|---|
| 1,551,893 A * | 9/1925 | McDonald | ............ | F16L 35/005 141/382 |
| 2,578,184 A * | 12/1951 | Green | ............ | F16L 11/16 220/86.2 |
| 4,079,952 A * | 3/1978 | Nishio | ............ | B60K 15/04 220/86.2 |
| 4,347,878 A * | 9/1982 | Schofield | ............ | B67C 11/02 141/300 |
| 4,426,027 A * | 1/1984 | Maynard, Jr. | ........ | B65D 47/063 222/529 |
| 4,548,344 A * | 10/1985 | Hestehave | ............ | B67D 7/58 222/382 |
| 4,583,668 A * | 4/1986 | Maynard, Jr. | ......... | B65D 25/48 141/367 |
| 4,730,652 A * | 3/1988 | Bartholomew | ...... | B60K 15/035 137/588 |
| 4,832,238 A * | 5/1989 | Taylor | ............ | B67C 11/02 141/330 |
| 4,921,147 A * | 5/1990 | Poirier | ............ | B65D 25/44 138/121 |
| 4,970,817 A * | 11/1990 | Mansfield | ............ | B67C 11/02 141/330 |
| 5,360,040 A * | 11/1994 | Thorn | ............ | B60K 15/04 141/286 |

(Continued)

FOREIGN PATENT DOCUMENTS

EP 1190884 5/2004

*Primary Examiner* — Chun Hoi Cheung
*Assistant Examiner* — Brijesh V. Patel
(74) *Attorney, Agent, or Firm* — Kyle A. Fletcher, Esq.

(57) ABSTRACT

The fuel tank adapter for a golf cart is configured for use with a motorized golf cart. The golf cart further comprises a fuel tank and a tank port. The fuel tank adapter for a golf cart is an extension device. The fuel tank adapter for a golf cart extends the tank port by creating a flow path that guides the liquid fuel from an inlet structure located on the exterior of the golf cart into the fuel tank through the tank port. The fuel tank adapter for a golf cart comprises a coupling structure, an extension structure, and the inlet structure. The inlet structure and the coupling structure attach to the extension structure. The coupling structure attaches the extension structure to the tank port of the fuel tank. The inlet structure receives liquid fuel from an external source and transports the received liquid fuel to the extension structure.

18 Claims, 4 Drawing Sheets

(56) References Cited

U.S. PATENT DOCUMENTS

| | | | |
|---|---|---|---|
| 5,722,570 A * | 3/1998 | Sultzer, III | B65D 47/063 |
| | | | 222/529 |
| 6,070,769 A | 6/2000 | Hornsby | |
| 6,223,793 B1 | 5/2001 | Donoughe | |
| 6,289,945 B1 * | 9/2001 | Haboush, II | B60K 15/035 |
| | | | 141/285 |
| 6,305,408 B1 * | 10/2001 | Goto | B60K 15/04 |
| | | | 137/351 |
| 6,405,767 B1 * | 6/2002 | Marsala | B60K 15/04 |
| | | | 141/286 |
| 6,435,233 B1 * | 8/2002 | Miura | F16L 35/00 |
| | | | 220/86.2 |
| 6,612,621 B2 * | 9/2003 | Oberheide | F16L 35/00 |
| | | | 220/86.2 |
| 6,648,376 B2 | 11/2003 | Christianson | |
| 6,763,973 B1 * | 7/2004 | Hudkins | B65D 21/023 |
| | | | 222/1 |
| 6,830,085 B1 | 12/2004 | Majewski | |
| 6,918,504 B2 * | 7/2005 | Miura | B60K 15/00 |
| | | | 137/351 |
| 7,114,536 B2 | 10/2006 | Guthrie | |
| 7,198,078 B2 * | 4/2007 | Miura | B60K 15/04 |
| | | | 141/285 |
| 7,478,611 B2 * | 1/2009 | Yoshida | F01P 11/0204 |
| | | | 123/41.08 |
| 8,100,297 B1 * | 1/2012 | Anish | B65D 47/068 |
| | | | 220/210 |
| D667,530 S | 9/2012 | Wyne | |
| 8,517,216 B2 * | 8/2013 | MacDougall | B65D 25/44 |
| | | | 222/1 |
| 8,567,457 B2 | 10/2013 | Polewarczyk | |
| 9,751,395 B2 | 9/2017 | Faruque | |
| 2009/0107565 A1 * | 4/2009 | Hanson | B60K 15/03 |
| | | | 137/544 |
| 2014/0319134 A1 * | 10/2014 | Olsen | B60S 1/50 |
| | | | 220/86.2 |
| 2015/0314677 A1 * | 11/2015 | Booth | B60K 15/04 |
| 2016/0083244 A1 * | 3/2016 | Ogiwara | B67C 11/02 |
| | | | 141/300 |
| 2018/0222314 A1 * | 8/2018 | Sakai | B60K 15/04 |

\* cited by examiner

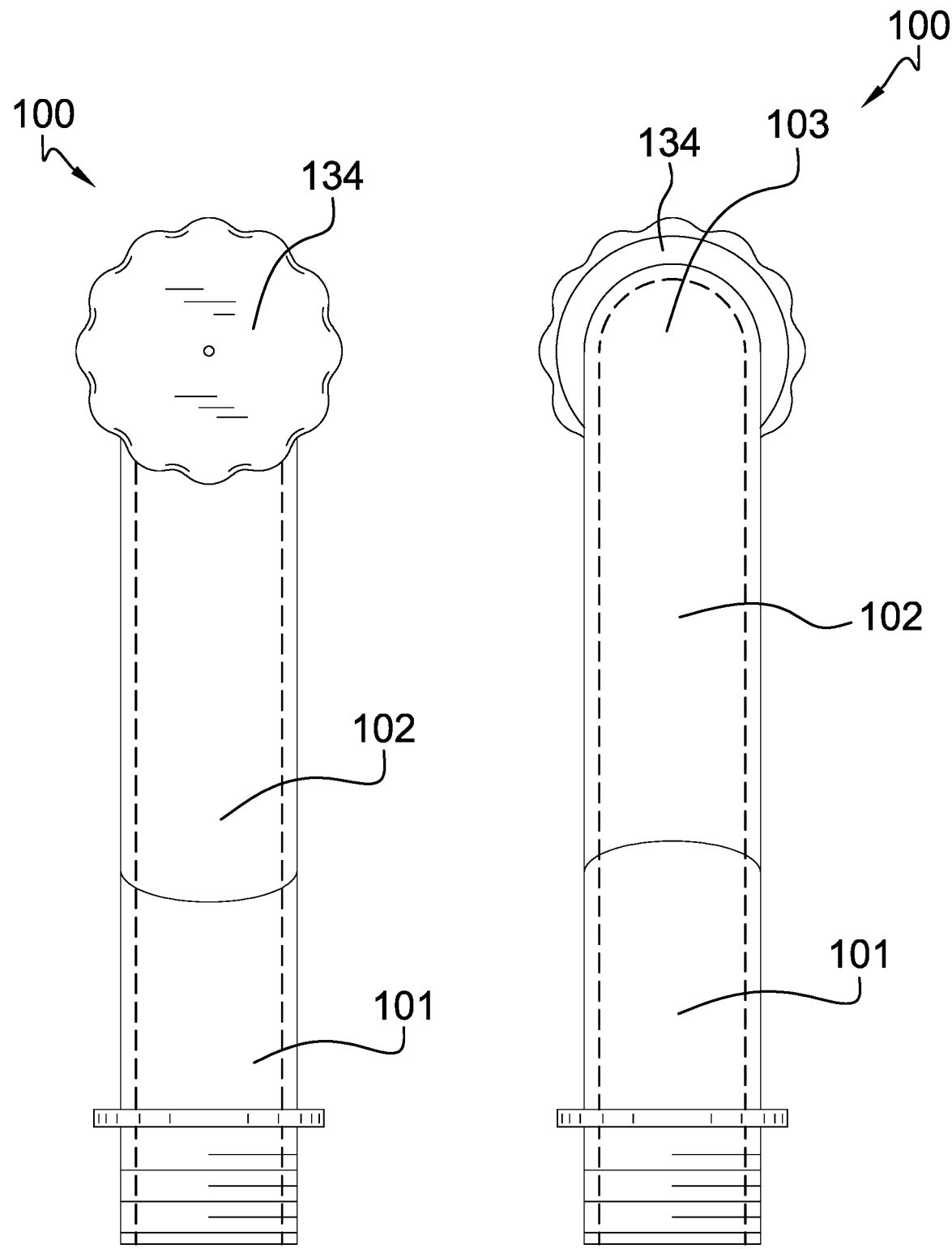

FUEL TANK ADAPTER FOR A GOLF CART

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles including arrangements for the fuel supply of combustion engines, more specifically, a tank inlet for a fuel tank configured for use with a golf cart. (B60K15/04)

SUMMARY OF INVENTION

The fuel tank adapter for a golf cart is configured for use with a motorized golf cart. The golf cart further comprises a fuel tank. The fuel tank is a container that stores liquid fuel used to power the golf cart. The fuel tank further comprises a tank port. The tank port is an opening through which the liquid fuel is introduced into the fuel tank. The fuel tank adapter for a golf cart is an extension device. The fuel tank adapter for a golf cart extends the tank port by creating a flow path that guides the liquid fuel from an inlet structure located on the exterior of the golf cart into the fuel tank through the tank port. The fuel tank adapter for a golf cart comprises a coupling structure, an extension structure, and the inlet structure. The inlet structure and the coupling structure attach to the extension structure. The coupling structure attaches the extension structure to the tank port of the fuel tank. The inlet structure receives liquid fuel from an external source and transports the received liquid fuel to the extension structure. The extension structure transports the liquid fuel to the coupling structure.

These together with additional objects, features and advantages of the fuel tank adapter for a golf cart will be readily apparent to those of ordinary skill in the art upon reading the following detailed description of the presently preferred, but nonetheless illustrative, embodiments when taken in conjunction with the accompanying drawings.

In this respect, before explaining the current embodiments of the fuel tank adapter for a golf cart in detail, it is to be understood that the fuel tank adapter for a golf cart is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the fuel tank adapter for a golf cart.

It is therefore important that the claims be regarded as including such equivalent construction insofar as they do not depart from the spirit and scope of the fuel tank adapter for a golf cart. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a front view of an embodiment of the disclosure.
FIG. 3 is a rear view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
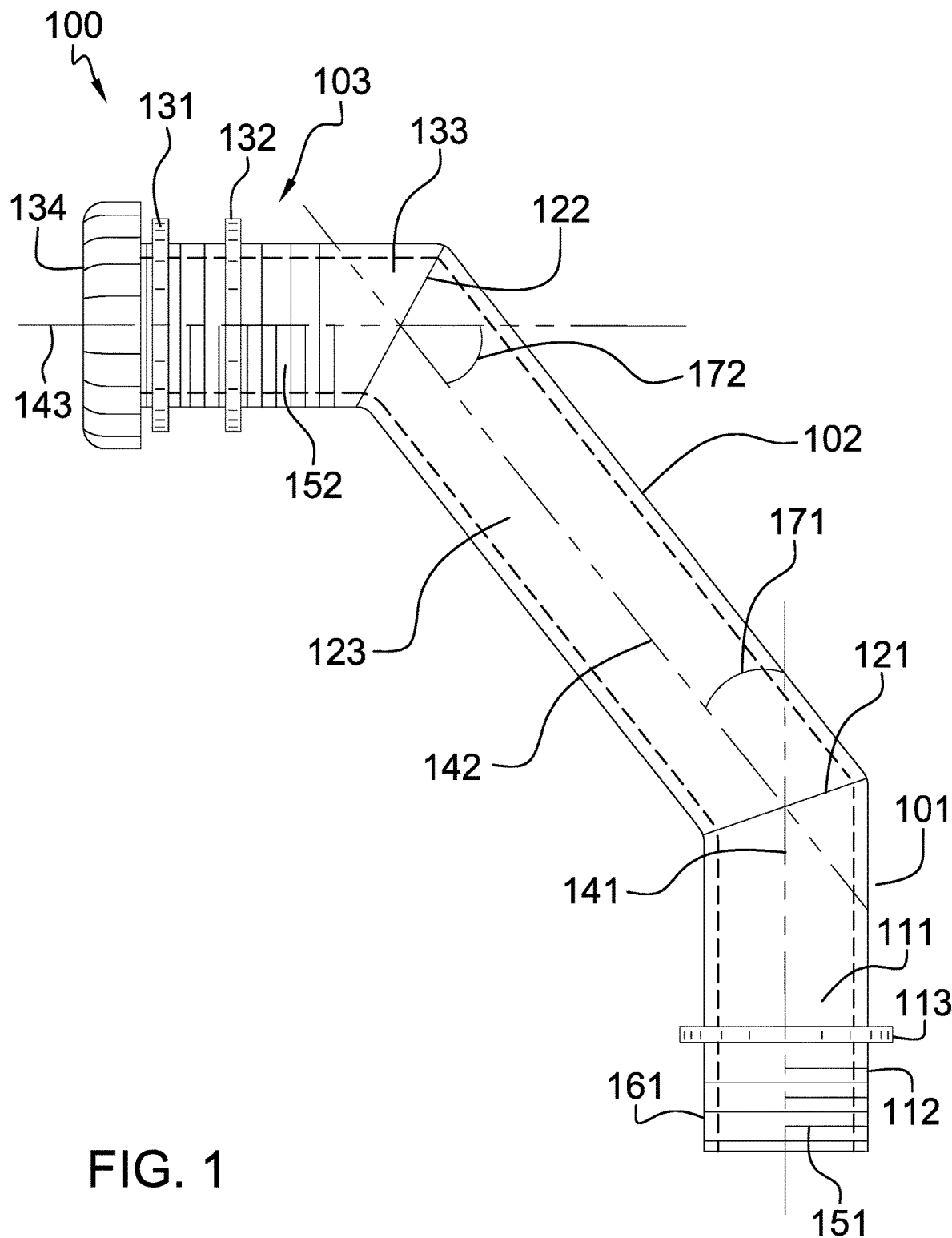
FIG. 1 is a side view of an embodiment of the disclosure.
Figure 4:
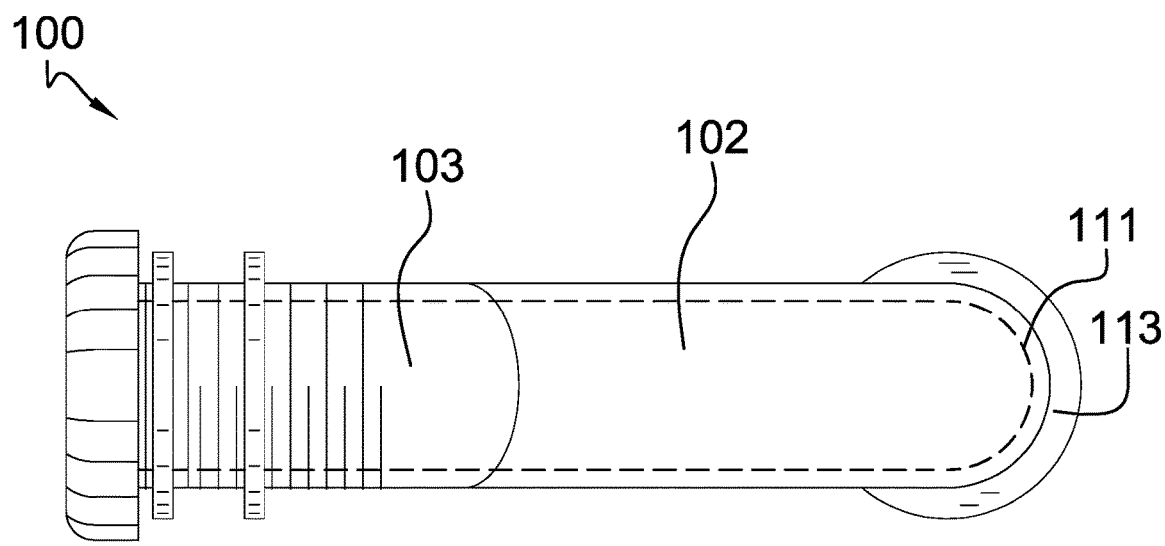
FIG. 4 is a top view of an embodiment of the disclosure.
Figure 5:
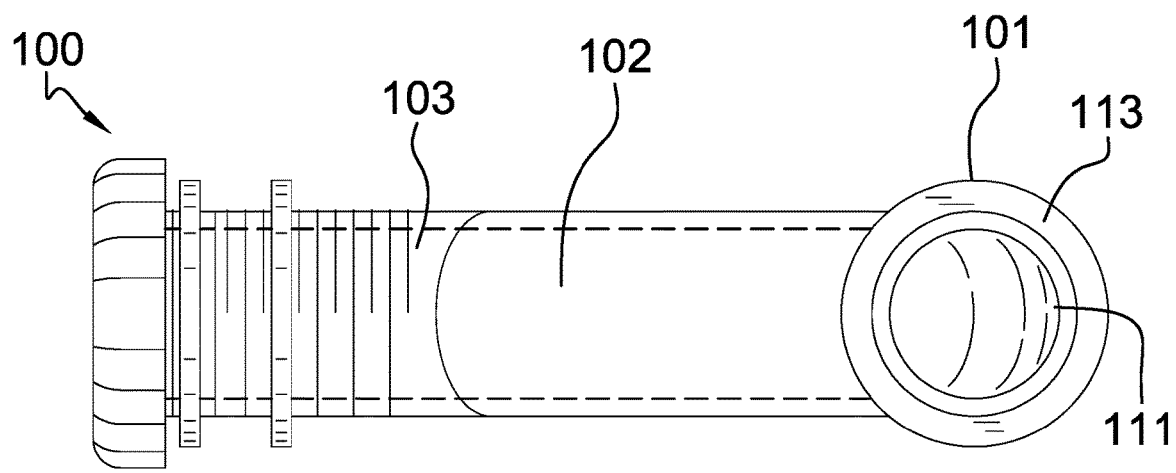
FIG. 5 is a bottom view of an embodiment of the disclosure.
Figure 6:
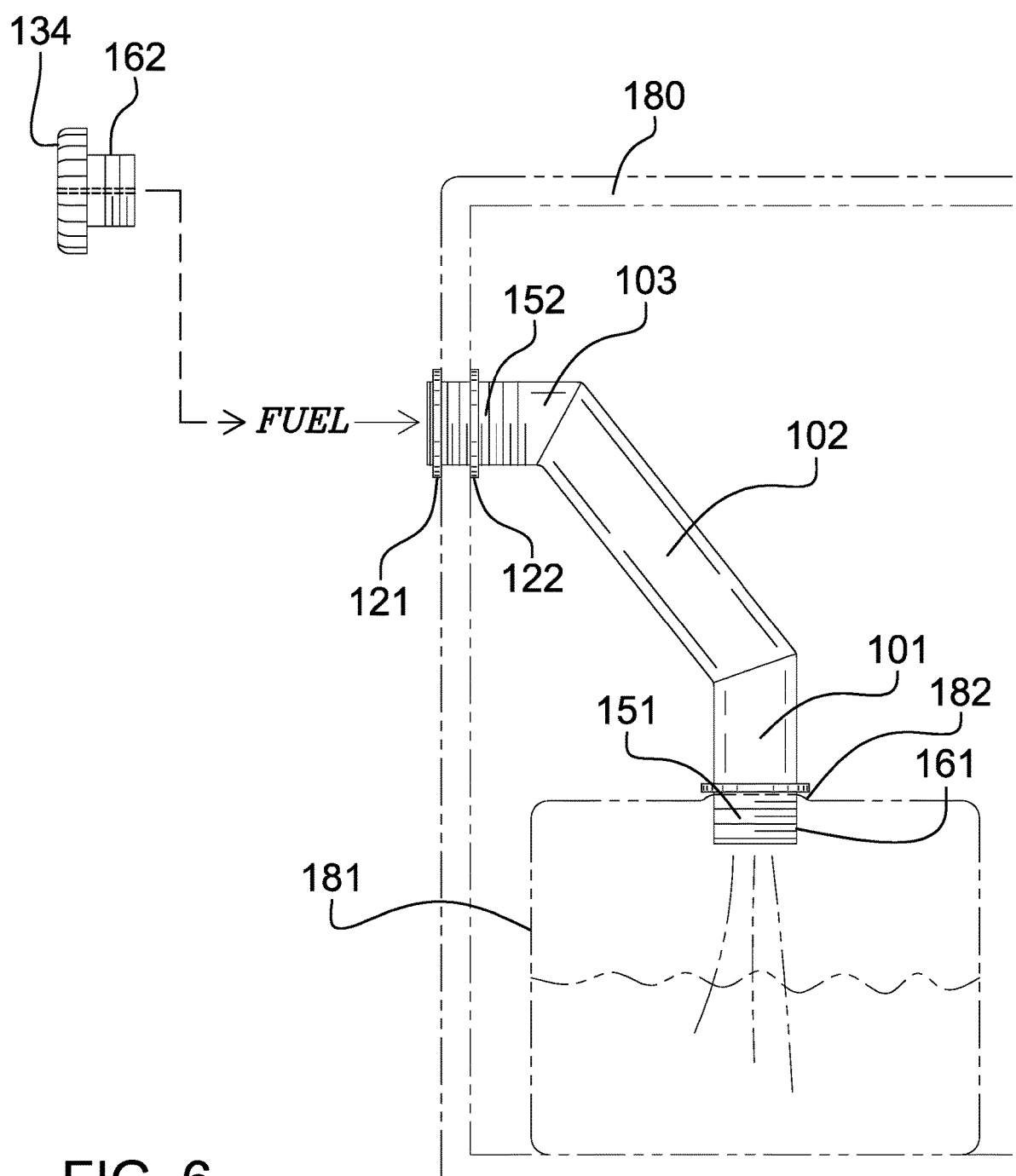
FIG. 6 is an in-use view of an embodiment of the disclosure.

Detailed reference will now be made to one or more potential embodiments of the disclosure, which are illustrated in FIGS. 1 through 6.

The fuel tank adapter for a golf cart 100 (hereinafter invention) is configured for use with a motorized golf cart 180. The golf cart 180 further comprises a fuel tank 181. The fuel tank 181 is a container that stores liquid fuel used to power the golf cart 180. The fuel tank 181 further comprises a tank port 182. The tank port 182 is an opening through which the liquid fuel is introduced into the fuel tank 181. The tank port 182 comprises a first interior screw thread 161. The invention 100 is an extension device. The invention 100 extends the tank port 182 by creating a flow path that guides the liquid fuel from an inlet structure 103 located on the exterior of the golf cart 180 into the fuel tank 181 through the tank port 182. The invention 100 comprises a coupling structure 101, an extension structure 102, and the inlet structure 103. The inlet structure 103 and the coupling structure 101 attach to the extension structure 102. The coupling structure 101 attaches the extension structure 102 to the tank port 182 of the fuel tank 181. The inlet structure 103 receives liquid fuel from an external source and transports the received liquid fuel to the extension structure 102. The extension structure 102 transports the liquid fuel to the coupling structure 101.

A note on usage. This disclosure identifies a component referred to as the lead pipe 111. The "lead" in the lead pipe 111 is not intended to refer to the element 82 of the periodic table, which is commonly abbreviated as Pb and in English has the name lead. The "lead" in the lead pipe 111 is intended to refer to the concept of being in an advanced position relative to others and that the lead pipe 111 directly connects to the tank port 182 of the golf cart 180.

The coupling structure 101 is a fitting. The coupling structure 101 attaches the extension structure 102 to the tank port 182 of the fuel tank 181 such that liquid fuel will flow from the extension structure 102 into the tank port 182. The coupling structure 101 comprises a lead pipe 111, a threaded connection 112, and a shoulder 113. The lead pipe 111 is further defined with a first center axis 141.

The lead pipe 111 is a pipe. The lead pipe 111 forms the fluidic connection between the extension structure 102 and the tank port 182 of the fuel tank 181.

The threaded connection 112 is a well-known and documented fastening mechanism. The threaded connection 112 is defined in greater detail elsewhere in this disclosure. The threaded connection 112 attaches the end of the lead pipe 111 that is distal from the extension structure 102. The threaded connection 112 allows the coupling structure 101 to screw into the tank port 182 of the fuel tank 181. The threaded connection 112 comprises a first exterior screw thread 151 and the first interior screw thread 161.

The shoulder 113 is a ridge formed on the exterior surface of the lead pipe 111. The shoulder 113 forms a barrier that prevents the lead pipe 111 from being screwed too deeply into the tank port 182.

The extension structure 102 is a pipe. The extension structure 102 forms a channel that transports the liquid fuel from the inlet structure 103 to the coupling structure 101. The extension structure 102 creates a separation of distance between the inlet structure 103 and the coupling structure 101 such that the inlet structure 103 can install at a position convenient for receiving the liquid fuel. The extension structure 102 comprises a connection pipe 123. The connection pipe 123 further comprises a first cant 121 and a second cant 122. The connection pipe 123 is further defined with a second center axis 142.

The connection pipe 123 is a pipe. The connection pipe 123 physically transports the liquid fuel from the inlet structure 103 to the coupling structure 101.

The first cant 121 is a bevel that is formed in the end of the connection pipe 123 at the end of the connection pipe 123 that attaches to the lead pipe 111. The first cant 121 forms a lead cant 171 between the first center axis 141 and the second center axis 142. The first cant 121 changes the direction of the liquid fluid flow through the invention 100.

The second cant 122 is a bevel that is formed in the end of the connection pipe 123 at the end of the connection pipe 123 that attaches to the inlet pipe 133. The second cant 122 forms an inlet cant 172 between the third center axis 143 and the second center axis 142. The second cant 122 changes the direction of the liquid fluid flow through the invention 100.

The inlet structure 103 is a fitting. The inlet structure 103 receives the liquid fuel from an external source. The inlet structure 103 transports the received liquid fuel to the extension structure 102 for transportation to the coupling structure 101. The inlet structure 103 further comprises an inlet pipe 133, a first nut 131, a second nut 132, and a cap 134. The inlet pipe 133 is further defined with a third center axis 143. The cap 134 is further defined with a second interior screw thread 162.

The inlet pipe 133 is a pipe. The inlet pipe 133 physically transports the liquid fuel from the external source to the extension structure 102. The inlet pipe 133 is further formed with a second exterior screw thread 152.

The cap 134 is a plug. The cap 134 is further formed with a second interior screw thread 162. The cap 134 screws onto the second exterior screw thread 152 of the inlet pipe 133 to open and close the inlet pipe 133.

The first nut 131 is a nut. The first nut 131 screws onto the second exterior screw thread 152 of the inlet pipe 133. The second nut 132 is a nut. The second nut 132 screws onto the second exterior screw thread 152 of the inlet pipe 133. The first nut 131 and the second nut 132 work in combination to secure the free end of the inlet pipe 133 to the golf cart 180.

The following definitions were used in this disclosure:

Bevel: As used in this disclosure, a bevel is a slope that is formed in the edge or surface of an object.

Cant: As used in this disclosure, a cant is an angular deviation from one or more reference lines (or planes) such as a vertical line (or plane) or a horizontal line (or plane).

Cap: As used in this disclosure, a cap is a protective cover that encloses a space.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Cylinder: As used in this disclosure, a cylinder is a geometric structure defined by two identical flat and parallel ends, also commonly referred to as bases, which are circular in shape and connected with a single curved surface, referred to in this disclosure as the lateral face. The cross-section of the cylinder remains the same from one end to another. The axis of the cylinder is formed by the straight line that connects the center of each of the two identical flat and parallel ends of the cylinder. Unless otherwise stated within this disclosure, the term cylinder specifically means a right cylinder, which is defined as a cylinder wherein the curved surface perpendicularly intersects with the two identical flat and parallel ends.

Extension Structure: As used in this disclosure, an extension structure is an inert physical structure that is used to extend the span of the distance between any two objects.

Exterior Screw Thread: An exterior screw thread is a ridge wrapped around the outer surface of a tube in the form of a helical structure that is used to convert rotational movement into linear movement.

Fitting: As used in this disclosure, a fitting is a component that is attached to a first object. The fitting is used to form a fluidic connection between the first object and a second object.

Fluid: As used in this disclosure, a fluid refers to a state of matter wherein the matter is capable of flow and takes the shape of a container it is placed within. The term fluid commonly refers to a liquid or a gas.

Fluidic Connection: As used in this disclosure, a fluidic connection refers to a tubular structure that transports a fluid from a first object to a second object. Methods to design and use a fluidic connections are well-known and documented in the mechanical, chemical, and plumbing arts.

Interior Screw Thread: An interior screw thread is a groove that is formed around the inner surface of a tube in the form of a helical structure that is used to convert rotational movement into linear movement.

Liquid: As used in this disclosure, a liquid refers to a state (phase) of matter that is fluid and that maintains, for a given pressure, a fixed volume that is independent of the volume of the container.

Nut: As used in this disclosure, a nut is a first object that is formed with a cylindrical negative space that further comprises an interior screw thread such that a second object with a matching exterior screw thread can screw into the first object forming a threaded connection. A nut is further defined with an inner diameter.

Phase: As used in this disclosure, phase refers to the state of the form of matter. The common states of matter are solid, liquid, gas, and plasma.

Pipe: As used in this disclosure, a pipe is a hollow cylindrical device that is used for transporting liquids and gases. The line that connects the center of the first base of the cylinder to the center of the second base of the cylinder is referred to as the axis of the cylinder or the centerline of the pipe. When two pipes share the same centerline they are said to be aligned. In this disclosure, the terms inner diameter of a pipe and outer diameter are used as they would be used by those skilled in the plumbing arts.

Plug: As used in this disclosure, a plug is an object that is used: 1) as a barrier to block access to a cavity or an aperture; or, 2) a connection device that is inserted into a port, cavity, or aperture for the purpose of attaching a first object to a second object.

Ridge: As used in this disclosure, a ridge is a rectangular block structure attaches to and projects vertically away from away from a first surface.

Screw: As used in this disclosure, to screw is a verb meaning: 1) to fasten or unfasten (unscrew) a threaded connection; or 2) to attach a helical structure to a solid structure.

Tank: As used in this disclosure, a tank is an enclosed hollow structure used to store a fluid.

Threaded Connection: As used in this disclosure, a threaded connection is a type of fastener that is used to join a first tube-shaped and a second tube-shaped object together. The first tube-shaped object is fitted with a first fitting selected from an interior screw thread or an exterior screw thread. The second tube-shaped object is fitted with the remaining screw thread. The tube-shaped object fitted with the exterior screw thread is placed into the remaining tube-shaped object such that: 1) the interior screw thread and the exterior screw thread interconnect; and, 2) when the tube-shaped object fitted with the exterior screw thread is rotated the rotational motion is converted into linear motion that moves the tube-shaped object fitted with the exterior screw thread either into or out of the remaining tube-shaped object. The direction of linear motion is determined by the direction of rotation.

With respect to the above description, it is to be realized that the optimum dimensional relationship for the various components of the invention described above and in FIGS. 1 through 6 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The invention claimed is:

1. An inlet for a fuel tank comprising:
a coupling structure, an extension structure, and an inlet structure;
wherein the inlet structure and the coupling structure attach to the extension structure;
wherein the inlet is for use with a golf cart;
wherein the inlet is for use with a liquid fuel;
wherein the golf cart further comprises a fuel tank;
wherein the fuel tank of the golf cart further comprises a tank port;
wherein the tank port comprises a first interior screw thread;
wherein the inlet structure further comprises an inlet pipe, a first nut, a second nut, and a cap;
wherein the inlet pipe is further defined with a third center axis;
wherein the first nut attaches to the inlet pipe;
wherein the second nut attaches to the inlet pipe;
wherein the cap attaches to the inlet pipe;
wherein the inlet pipe is further formed with a second exterior screw thread;
wherein the cap is further defined with a second interior screw thread.

2. The inlet for a fuel tank according to claim 1 wherein the inlet extends the tank port by creating a flow path that guides the liquid fuel from the inlet structure located on an exterior of the golf cart into the fuel tank through the tank port.

3. The inlet for a fuel tank according to claim 2
wherein the coupling structure attaches the extension structure to the tank port of the fuel tank;
wherein the inlet structure receives the liquid fuel from an external source and transports the received liquid fuel to the extension structure;
wherein the extension structure transports the liquid fuel to the coupling structure.

4. The inlet for a fuel tank according to claim 3
wherein the coupling structure is a fitting;
wherein the coupling structure attaches the extension structure to the tank port of the fuel tank such that liquid fuel will flow from the extension structure into the tank port.

5. The inlet for a fuel tank according to claim 4 wherein the extension structure forms a channel that transports the liquid fuel from the inlet structure to the coupling structure.

6. The inlet for a fuel tank according to claim 5 wherein the extension structure creates a separation of distance between the inlet structure and the coupling structure such that the inlet structure is installed at a position convenient for receiving the liquid fuel.

7. The inlet for a fuel tank according to claim 6
wherein the inlet structure is a fitting;
wherein the inlet structure receives the liquid fuel from an external source;
wherein the inlet structure transports the received liquid fuel to the extension structure for transportation to the coupling structure.

8. The inlet for a fuel tank according to claim 7
wherein the coupling structure comprises a lead pipe, a threaded connection, and a shoulder;
wherein the shoulder and the threaded connection attach to the lead pipe;
wherein the lead pipe is further defined with a first center axis.

9. The inlet for a fuel tank according to claim 8
wherein the lead pipe is a pipe;
wherein the lead pipe forms the fluidic connection between the extension structure and the tank port of the fuel tank.

10. The inlet for a fuel tank according to claim 9
wherein the threaded connection is formed on the end of the lead pipe that is distal from the extension structure;
wherein the threaded connection screws into the tank port of the fuel tank.

11. The inlet for a fuel tank according to claim 10 wherein the threaded connection comprises a first exterior screw thread and the first interior screw thread.

12. The inlet for a fuel tank according to claim 11
wherein the shoulder is a ridge formed on the exterior surface of the lead pipe;
wherein the shoulder forms a barrier that prevents the lead pipe from being screwed too deeply into the tank port.

13. The inlet for a fuel tank according to claim 12
wherein the extension structure comprises a connection pipe;
wherein the connection pipe further comprises a first cant and a second cant;
wherein the connection pipe is further defined with a second center axis;
wherein the connection pipe physically transports the liquid fuel from the inlet structure to the coupling structure.

14. The inlet for a fuel tank according to claim 13
wherein the first cant is a bevel that is formed in the end of the connection pipe at the end of the connection pipe that attaches to the lead pipe;
wherein the second cant is a bevel that is formed in the end of the connection pipe at the end of the connection pipe that attaches to the inlet pipe;
wherein the first cant forms a lead cant between the first center axis and the second center axis;
wherein the second cant forms an inlet cant between the third center axis and the second center axis.

15. The inlet for a fuel tank according to claim 14
wherein the first cant changes the direction of the liquid fluid flow through the inlet;
wherein the second cant changes the direction of the liquid fluid flow through the inlet.

16. The inlet for a fuel tank according to claim 15
wherein the first nut is a nut;
wherein the first nut screws onto the second exterior screw thread of the inlet pipe.

17. The inlet for a fuel tank according to claim 16
wherein the second nut is a nut;
wherein the second nut screws onto the second exterior screw thread of the inlet pipe.

18. The inlet for a fuel tank according to claim 17, wherein the cap screws onto the second exterior screw thread of the inlet pipe to open and close the inlet pipe.

* * * * *